US009330399B2

(12) United States Patent
Morse et al.

(10) Patent No.: US 9,330,399 B2
(45) Date of Patent: *May 3, 2016

(54) DIGITAL PUNCH CARD FOR MOBILE DEVICE

(71) Applicant: Google Inc., Mountain View, CA (US)

(72) Inventors: Reed Morse, Palo Alto, CA (US); Grantland Chew, San Francisco, CA (US)

(73) Assignee: GOOGLE INC., Mountain View, CA (US)

(*) Notice: Subject to any disclaimer, the term of this patent is extended or adjusted under 35 U.S.C. 154(b) by 30 days.

This patent is subject to a terminal disclaimer.

(21) Appl. No.: 14/220,128

(22) Filed: Mar. 19, 2014

(65) Prior Publication Data
US 2014/0207553 A1 Jul. 24, 2014

Related U.S. Application Data

(63) Continuation of application No. 13/046,663, filed on Mar. 11, 2011, now Pat. No. 8,698,598.

(51) Int. Cl.
G08B 5/22 (2006.01)
G06Q 30/02 (2012.01)
H04M 1/725 (2006.01)
H04W 4/02 (2009.01)

(52) U.S. Cl.
CPC ........ *G06Q 30/0225* (2013.01); *G06Q 30/0207* (2013.01); *H04M 1/72572* (2013.01); *H04W 4/02* (2013.01); *H04M 2250/10* (2013.01); *H04M 2250/52* (2013.01)

(58) Field of Classification Search
CPC .................................................. G07C 9/00111
USPC .......................................... 340/8.1, 5.1, 7.27
See application file for complete search history.

(56) References Cited

U.S. PATENT DOCUMENTS 8,698,598 B2 * 4/2014 Morse et al. ................... 340/8.1

* cited by examiner

*Primary Examiner* — Vernal Brown
(74) *Attorney, Agent, or Firm* — Johnson, Marcou & Isaacs, LLC

(57) ABSTRACT

A method for verifying a location of a user of a mobile device is disclosed. The method involves: receiving an indicia of a location of the mobile device based on an at-location element proximate to the mobile device; receiving a global positioning system (GPS) position associated with the mobile device; determining whether at least one security condition is satisfied based on the indicia of the location and the GPS position; and causing a next action to occur when the at least one security condition is satisfied, or not causing the next action to occur when the at least one security condition is not satisfied.

23 Claims, 5 Drawing Sheets

DIGITAL PUNCH CARD FOR MOBILE DEVICE

RELATED APPLICATIONS

This patent application is a continuation of and claims priority to U.S. patent application Ser. No. 13/046,663, filed Mar. 11, 2011 and entitled "Digital Punch Card for Mobile Devices." The entire contents of the above-identified priority application are hereby fully incorporated herein by reference.

BACKGROUND OF THE INVENTION

1. Field of the Invention

The present invention relates generally to location-based applications for mobile devices and, more specifically, to a digital punch card for a mobile device based on one or more security conditions.

2. Description of the Related Art

A primary goal of many consumer-based businesses, such as cafés, restaurants, dry cleaners, and clothing stores, is to attract and retain repeat customers. In order to achieve this goal, these businesses oftentimes offer "promotional punch cards" to their customers. For example, a café could offer a "buy 10 coffees get one free" promotion. In order to implement this promotion, the café would give a customer a punch card, typically the size of a business card, and mark the punch card every time the customer buys a cup of coffee. After the customer receives 10 marks on the punch card, she would present the card to the salesperson at the café, who would give her a free coffee.

While punch cards are convenient to the degree they increase customer loyalty and allow customers to save money, customers often misplace or damage their punch cards. As a result, customers are frequently unable to take full advantage of their punch cards, thereby undermining the business purposes underlying the use of punch cards.

To address the problems with conventional punch cards and to leverage the ubiquity of mobile devices, several mobile phone-based punch card applications have been developed. These mobile phone-based punch cards typically operate by scanning a barcode with a camera of the phone, with each scan of the barcode being equivalent to a mark on the punch card. One drawback of this approach is that mobile phone-based punch card applications rely heavily on customer honesty. For example, a customer could easily cheat such an application by scanning a copy of the barcode multiple times or reporting that she is at a false location. In other words, a dishonest customer could easily falsify her use of a digital punch card without actually purchasing any items from the business promoting the punch card, again undermining the business purposes underlying the use of the punch card.

Other mobile phone applications allow a user to "check in" to a location by typing a location name into the phone and broadcasting to her friends on a social networking website that she is at the location. However, such applications also are not very useful as a replacement for physical punch cards because a mobile phone user can easily falsify the location from where she is broadcasting, thereby undermining the business purposes underlying the use of punch cards due to the easy falsification.

As the foregoing illustrates, what is needed in the art is a more secure technique for implementing digital punch cards.

SUMMARY OF THE INVENTION

Embodiments provide a method, computer-readable medium or system for verifying a location of a user of a mobile device. The technique involves: receiving an indicia of a location of the mobile device based on an at-location element proximate to the mobile device; receiving a global positioning system (GPS) position associated with the mobile device; determining whether at least one security condition is satisfied based on the indicia of the location and the GPS position; and causing a next action to occur when the at least one security condition is satisfied, or not causing the next action to occur when the at least one security condition is not satisfied.

Additional embodiments provide method, computer-readable medium or system for verifying a location of a user of a mobile device. The technique involves: receiving an indicia of a location of the mobile device based on an at-location element; calculating a global positioning system (GPS) position associated with the mobile device; transmitting the indicia of the location and the GPS position to a server machine; and receiving a confirmation message when at least one security condition is satisfied based on the indicia of the location and the GPS position, or receiving a denial message when at least one security condition is not satisfied based on the indicia of the location and the GPS position.

Embodiments provide a more efficient technique for verifying a location of a user which is beneficial, for example, in implementing digital punch cards for shopping.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
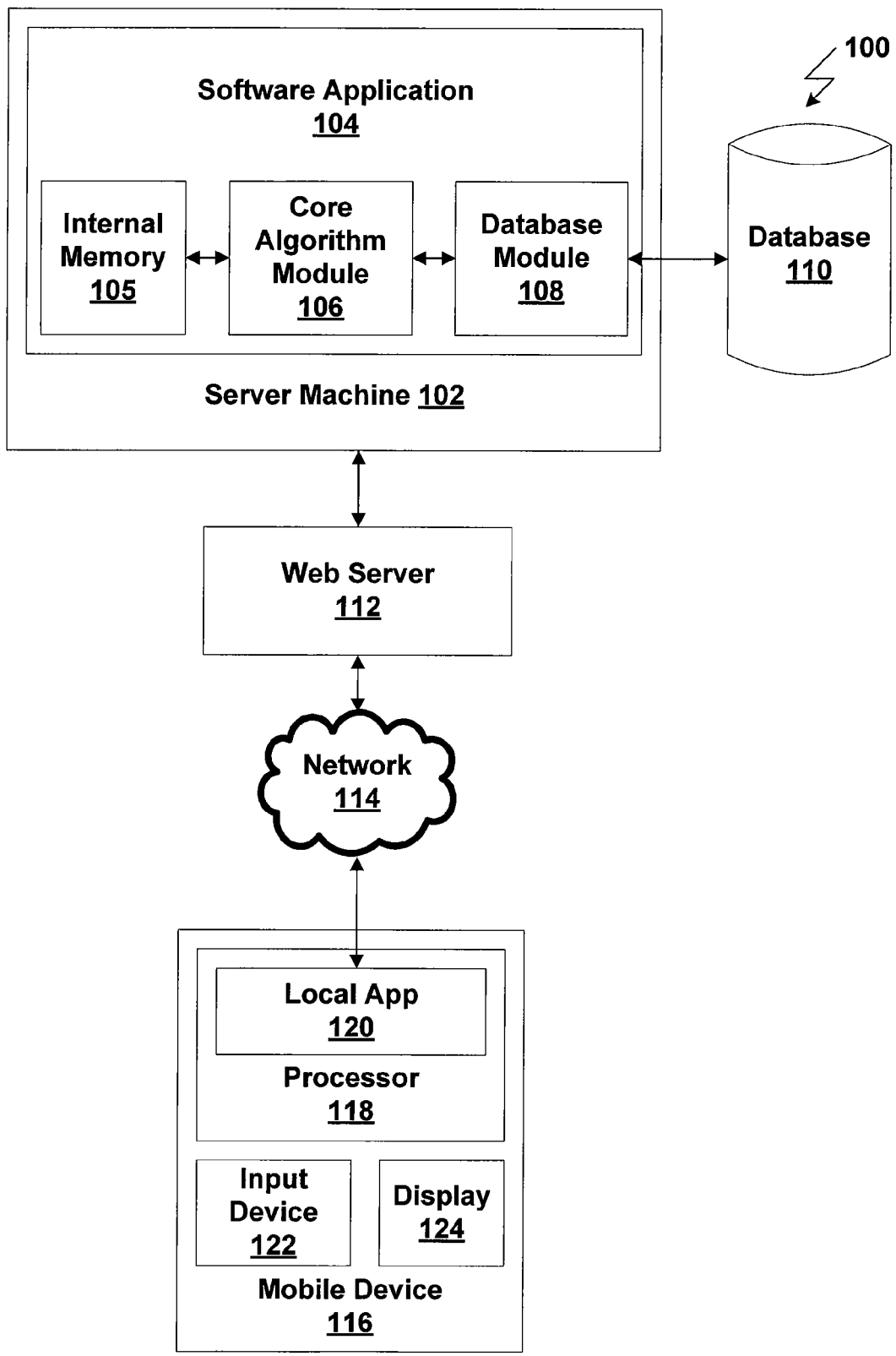
FIG. 1 is a block diagram illustrating a system configured to implement one or more aspects of the present invention.

FIG. 1 is a block diagram illustrating a system 100 configured to implement one or more aspects. As shown, the system 100 includes a server machine 102, a database 110, a web server 112, a network 114, and a mobile device 116.

The server machine 102 is configured to execute different applications, such as a software application 104, which includes instructions for implementing the server side of the methods described above in conjunction with FIGS. 2-5. The server machine 102 receives and transmits network requests to/from the web server 112. In an alternate embodiment, the system 100 may include multiple distributed server machines, such as server machine 102, to process requests received by the web server 112 in a more efficient manner.

The software application 104 includes an internal memory 105, a core algorithm module 106 and a database module 108. The internal memory 105 is a random access memory (RAM) used by the software application 104 and the core algorithm module 106 to store information. The core algorithm module 106 communicates with the database module 108 to transmit and retrieve information to/from the database 110. The database module 108 implements well-known database interfacing techniques, such as Java Database Connectivity (JDBC) or PHP/MYSQL, to communicate with the database 110. The database 110 is configured to store all information necessary to implement the techniques of FIGS. 2-5, set forth above. The core algorithm module 106 retrieves this information, as needed, via the database module 108.

The web server 112 is configured to accept requests and data content from the mobile device 116, via the network 114, and transmit those requests and data content to the server machine 102. The web server 112 is configured to transmit data content received from the server machine 102 to the mobile device 116.

In various embodiments the mobile device 116 may be a laptop computer, cellular phone, personal digital assistant (PDA), personal digital music/MP3 player or any other type of computing device configured to perform the functions and operations contemplated herein. The mobile device 116 includes a processor 118, an input device 122 and a display unit 124. The processor 118 includes a local app 120 that is configured to communicate with the web server 112, via the network 114. In one implementation, the local app 120 is a web browser. In another implementation, the local app 120 is a special-purpose software application configured to carry out the methods described in connection with FIGS. 2-5 of this document. The data content received by the local app 110 from the web server 112 may be displayed to a user of the mobile device 116 via the display 124. The data content received by the web browser may include data content associated with the software application 104. The user may manipulate the data content associated with the software application 104 using the input device 122. The user may update the user identity and account data and may view her progress toward a reward on one or more digital punch cards by manipulating the appropriate data content.

Figure 2:
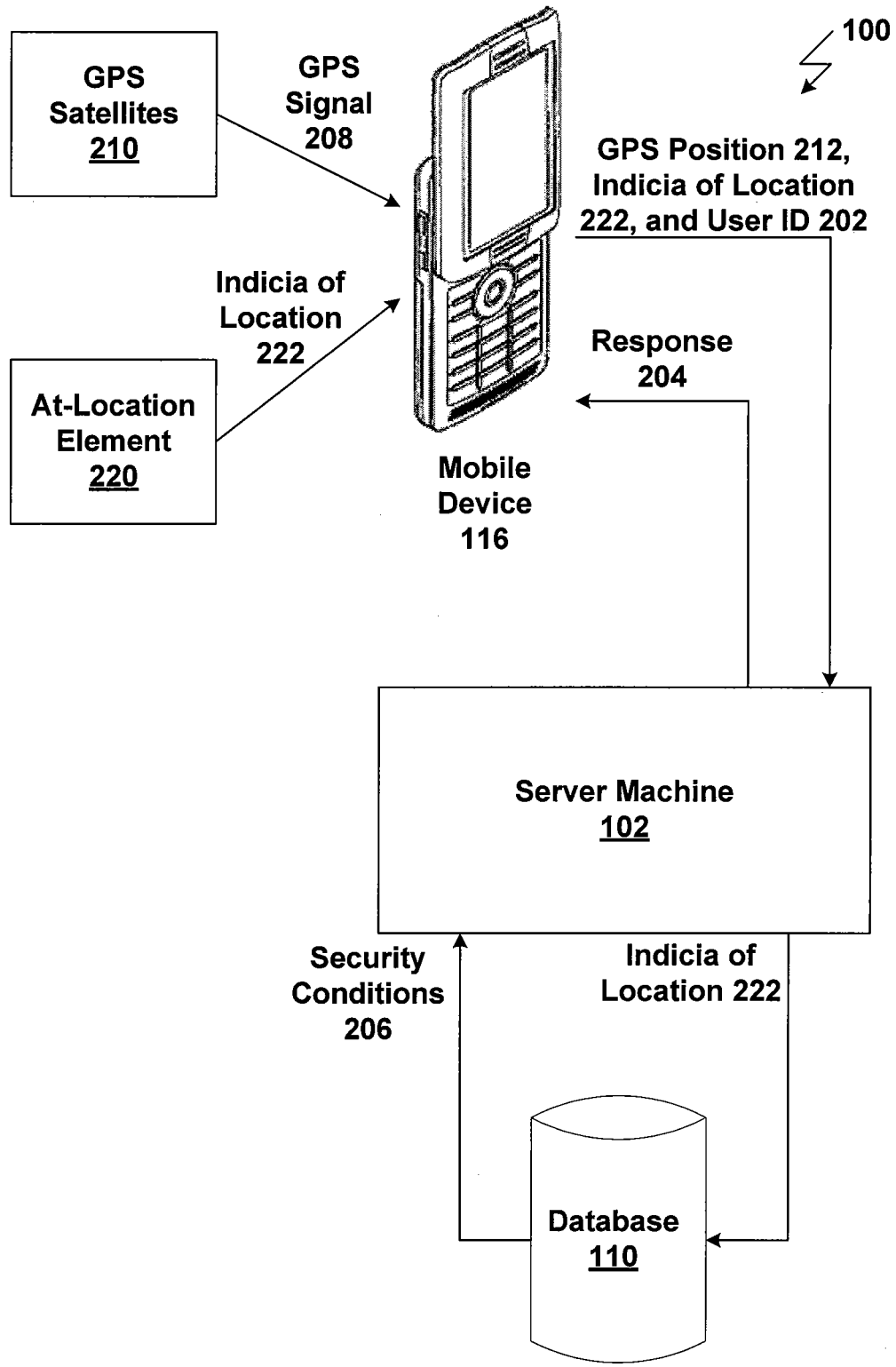
FIG. 2 illustrates the data transmissions between the various elements of the system of FIG. 1, according to one embodiment of the present invention.

FIG. 2 illustrates the data transmissions between the various elements of the system 100 of FIG. 1, according to one embodiment. The system elements include global positioning system (GPS) satellites 210, an at-location element 220, the mobile device 116, the server machine 102, and the database 110.

As shown, the mobile device 116 receives a GPS signal 208 from GPS satellites 210 allowing the mobile device to calculate a GPS position 212 of the mobile device. The mobile device 116 also receives an input from the at-location element 220 including an indicia of location 222 of the mobile device 116. Those skilled in the art would recognize that many different at-location elements 220 could be used to obtain indicia of location 222. For example a photograph of a landmark or a barcode or quick response (QR) code, taken by a camera on mobile device 116, could be an indicia of a location 222 where the landmark is situated or the barcode or QR code is located. In this case, the landmark, barcode or QR code serves as the at-location element 220. In another embodiment, the at-location element 220 could be a local short-range radio transmitter, such as a radio frequency identification (RFID) signal generator or a near-field communication (NFC) signal generator. In this case, the indicia of the location 222 corresponding to the at-location element 220 would be the radio signal generated by the transmitter.

According to one embodiment, after receiving the GPS position 212 and the indicia of the location 222, the mobile device 116 transmits (1) the GPS position 212, (2) the indicia of the location 222, and (3) the user identity information 202 to the server machine 102. In one embodiment, the user identity information 202 is a unique identifier associated with the user of the mobile device 116, which is oftentimes represented as a string of characters or a number. As one skilled in the art would understand, in some cases transmitting (1) the GPS position 212, (2) the indicia of the location 222 or (3) the user identity information 202 may not be practical. In these cases, the mobile device 116 may transmit a representation of (1) the GPS position 212, (2) the indicia of the location 222 or (3) the user identity information 202 in place of the original data. For example, while techniques for transmitting photograph are well established in the field of computer science, techniques for transmitting a short-range radio signal to a remote server are not so well-established.

According to one embodiment, after transmitting this data to the server machine 102, the mobile device 116 receives a response 204 from the server machine 102. The response 204 could be either a confirmation message or a denial message. In one embodiment, the system is used to implement a digital punch card, which is an electronic version of promotional paper-based punch cards that stores give to customers to implement "buy 10 get one free" or similar offers. If the system is used to implement a digital punch card, the confirmation message would indicate that the user's digital punch card was punched, and the denial message would indicate that the user's digital punch card was not punched. The server machine 102 makes the decision as to whether to send a confirmation message response 204 or a denial message response 204.

In one embodiment, the server machine 102 decides which response 204 to send to the mobile device 116 by consulting the database 110. The server machine 102 transmits to the database, the indicia of the location 222. In response, the database 110 transmits the security conditions 206 for the particular location to the server machine 102. The server machine 102 can then determine an appropriate response 204 to send to the mobile device 116. In one embodiment, the system is used to implement a digital punch card and the location is a store offering promotional digital punch cards. According to one embodiment, the security conditions 206 are associated with the store offering the digital punch card, and are set by a representative of the store.

Figure 3:
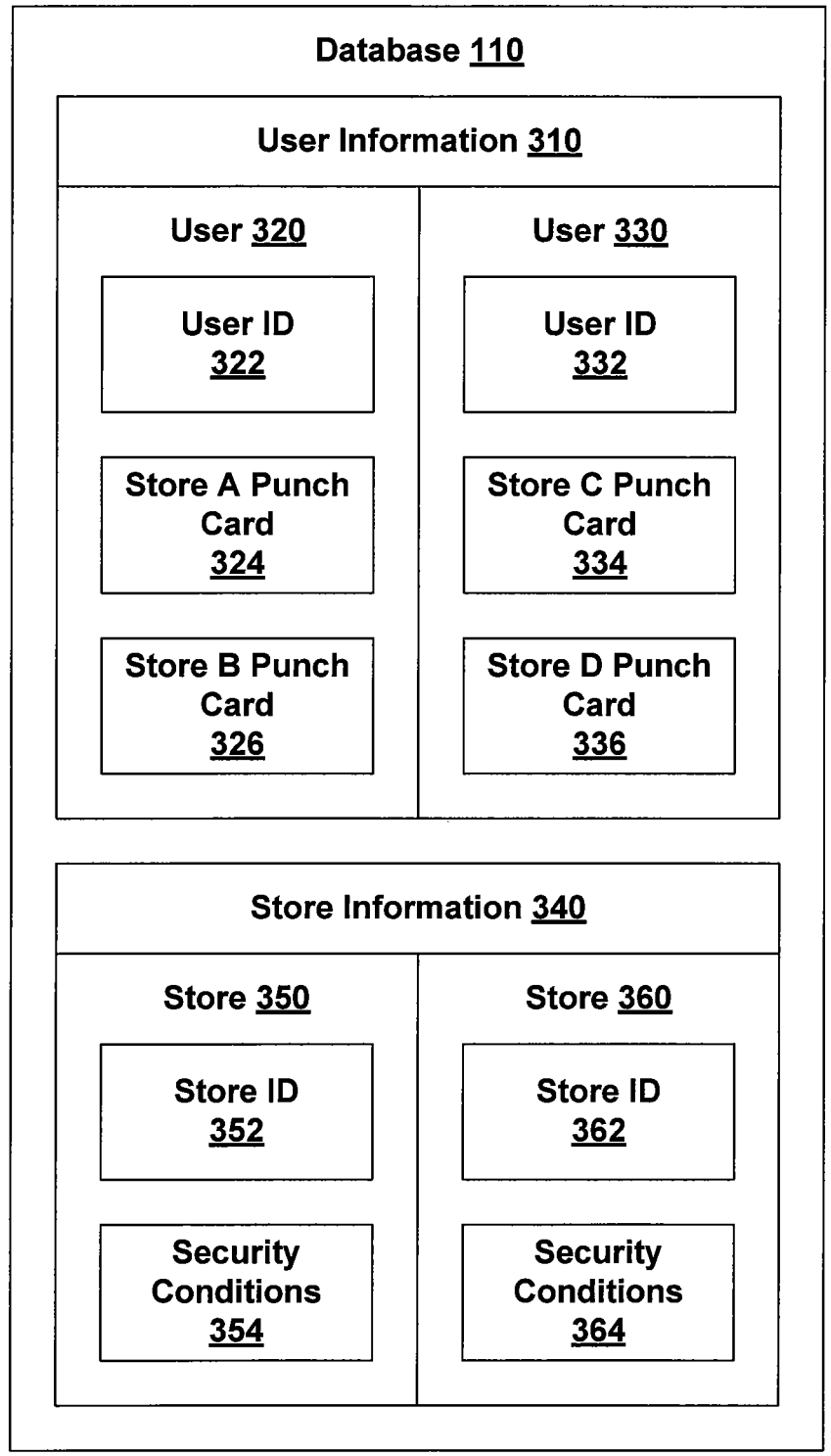
FIG. 3 is a more detailed illustration of the database associated with the server machine of FIG. 1, according to one embodiment of the present invention.

FIG. 3 is a more detailed illustration of the database 110 associated with the server machine 102 of FIG. 1. In one embodiment, the database 110 includes user information 310 and store information 340.

The user information 310 includes information about a plurality of end-users (user 320 and user 330) of digital punch cards. While only two users are illustrated for purposes of brevity, those skilled in the art would understand that a typical database could accommodate many more users. The information stored about the user 320 includes a user ID 322, and punch cards for various stores visited by user 320, including store A punch card 324 and store B punch card 326. User ID 322 uniquely identifies the user 320. While user 320 is only illustrated as having two store punch card, those skilled in the art would understand that a user could have any number of punch cards. In addition, the database could store other information (not illustrated) about user 320, such as a password, the user's email address, postal address, telephone number, credit card information, etc. Similar information is stored about user 330, including the user ID 332 and store digital punch cards, including store C punch card 334 and store D punch card 336. While, in FIG. 3, user 320 and user 330 have punch cards at different stores, in one embodiment of the invention (not illustrated) two users could have a punch card at the same store. For example both user 320 and user 330 could have an additional punch card at store E (not illustrated). According to another embodiment, users have an opportunity to add or delete store punch cards in their accounts using mobile device 116.

Those skilled in the art would recognize that one benefit of storing user information 310 about each user (320 and 330) in database 110 is that a user could access her punch cards from multiple mobile devices 116. Also, if a user decides to replace one mobile device 116 with another, she can download local app 120 to her new mobile device 116 and access all of her punch cards seamlessly. In one embodiment, if a user's mobile device 116 is lost or stolen, the user may cancel her punch cards until the mobile device 116 is replaced, at which time the user may continue using the punch cards.

The store information 340 includes information about stores that provide digital punch cards to customers using the system described herein. Two exemplary stores (store 350 and store 360) are illustrated in FIG. 3. However, those skilled in the art would understand that information concerning more or fewer than two stores could be stored in the database 110. For example, a store ID 352 and security conditions 354 are stored in conjunction with store 350. Store ID 352 uniquely identifies store 350 and is oftentimes represented as a string of characters or a number. The security conditions 354 include the requirements that a customer must meet to get a mark on a digital punch card associated with the store 350 in addition to the basic requirement that the customer must capture a specified indicia of the location 222 of store 350 and a GPS position 212 corresponding to store 350.

For example, according to one embodiment, store 350 implements no security conditions 354 other than that the GPS position 212 indicates a location that is associated with the indicia of location 222 (both of which may be where store 350 is physically situated). According to another embodiment, the security conditions 354 include that the time difference between a timestamp 224 associated with the indicia of the location 222 and the timestamp 214 associated with the GPS position 212 must be less than a threshold time difference. In another embodiment, the security conditions 354 specify that a timestamp 224 associated with the indicia of the location 222 falls within a time when store 350 is open.

According to yet another embodiment, the security conditions 354 are that the user account has not requested a mark on the punch card for a certain time period before requesting the current mark. In one other embodiment, the indicia of the location 222 is a photograph of a landmark, barcode or QR code at the location. In this case, the security conditions 354 include a test that the photograph is a likely photograph of the landmark, barcode or QR code, rather than a photocopy of the barcode or QR code or an image generated without taking an original photograph by visiting store 350. One skilled in the art would realize that there are many different methods for determining whether an image is a likely original photograph. Other information that is stored regarding store 350 (not illustrated) may include a password, a type of business, a business address and hours, and contact information for a representative of the business. Similar information is captured about other stores, such as store 360, which has a store ID 362 and security conditions 364.

Figure 4:
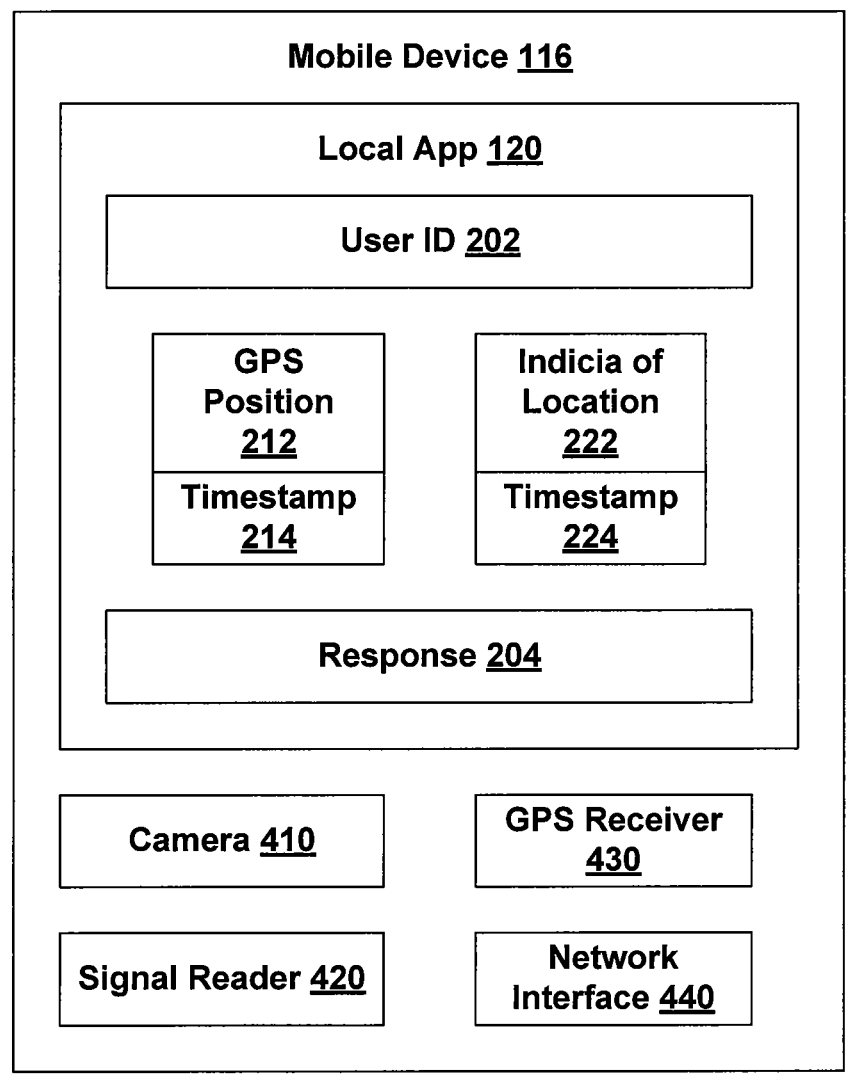
FIG. 4 is a more detailed illustration of the mobile computing device of FIG. 1, according to one embodiment of the present invention.

FIG. 4 is a more detailed illustration of the mobile computing device 116 of FIG. 1. In one embodiment, the mobile device includes several hardware components, such as a camera 410, a radio signal reader 420, a GPS receiver 430, and a network interface 440. As is well understood, the local app 120 configured to carry out the mobile device side method steps described in FIG. 5, is implemented in either hardware, software or a combination of hardware and software.

The camera 410 is configured to take photographs of barcodes, QR codes, and/or landmarks which could serve as indicia of a location 222. The signal reader 420 is configured to receive short-range radio signals, such as RFID or NFC signals, which could also serve as indicia of a location 222. The GPS receiver 430 is configured to receive GPS data representing the position of the mobile device. In one embodiment, GPS satellites provide GPS data to the GPS receiver 430. In another embodiment, mobile device 116 implements cellular tower triangulation techniques to obtain GPS data for the GPS receiver 430. The network interface 440 allows the mobile device 116 to communicate with other computing devices, such as server machine 102 over a network 114. Those skilled in the art would understand that network interface 440 could be a WiFi interface, cellular network interface, or any similar network interface configured for long-range data transmission.

In one embodiment, local app 120 also stores data including a user ID 202, a GPS position 212 and associated timestamp 214, and indicia of location 222 and associated timestamp 224. The user ID 202 uniquely identifies an account associated with the mobile device. The GPS position 212 represents the position of the mobile device 116. In one embodiment, the GPS position 212 includes a timestamp 214 representing the time when the GPS position 212 was calculated. Similarly, in one embodiment, the indicia of location 222 has an associated timestamp 224 representing the time when the indicia of location 222 was acquired. In addition, according to another embodiment, the local app 120 stores a representation of the response 204 that the local app receives from the server machine 102. In one embodiment, if the response 204 is a confirmation message, the response 204 further includes a mark on a digital punch card. Alternatively, if the response 204 is a denial message, the response 204 further includes information explaining why the request for a mark on the digital punch card was denied.

Figure 5:
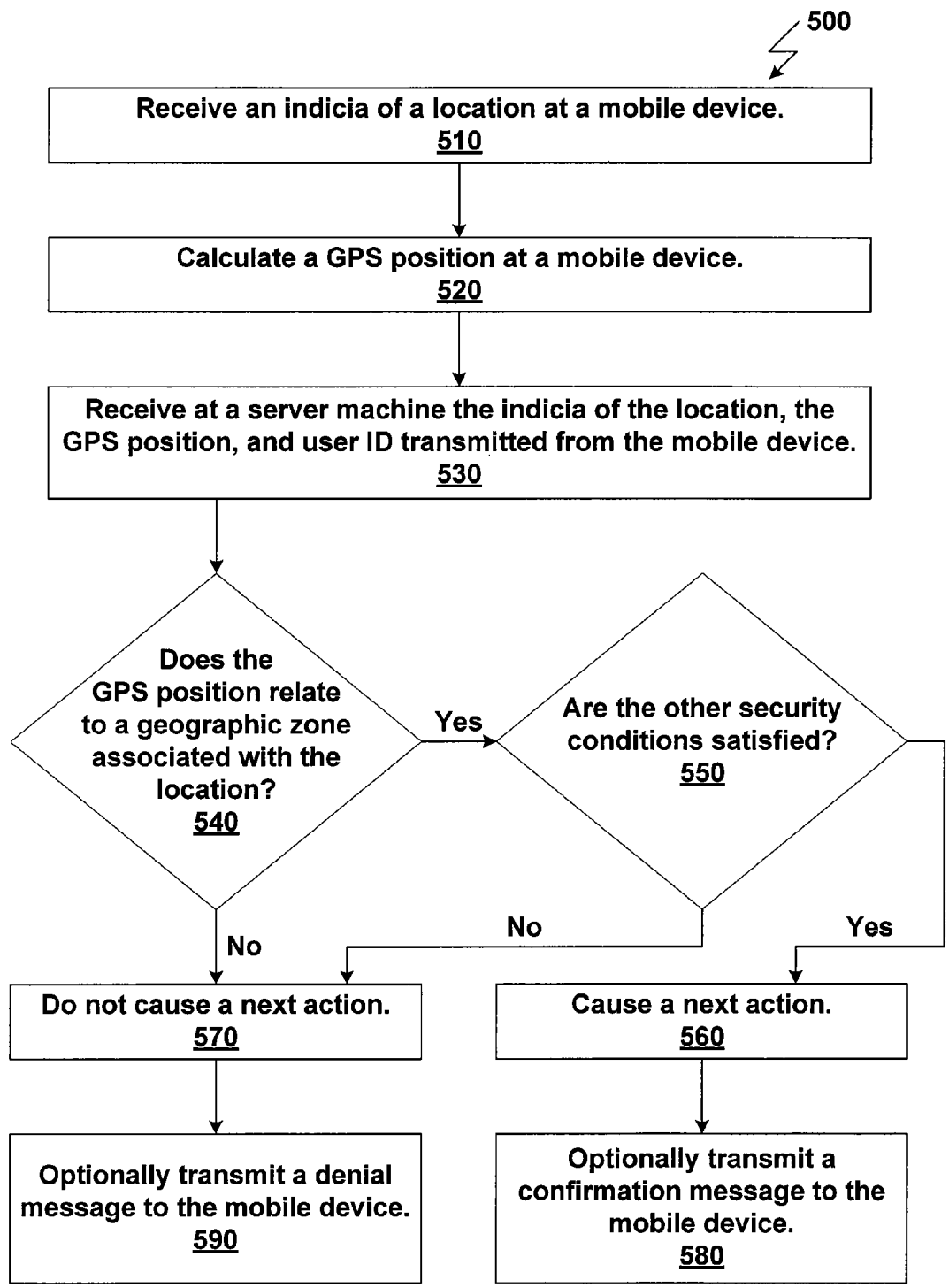
FIG. 5 is a flow diagram of method steps for verifying the location of a mobile device based on one or more security conditions, according to one embodiment of the present invention.

FIG. 5 is a flow diagram of method steps for verifying the location of a mobile device 116 based on one or more security conditions 206, according to one embodiment. Although the method steps are described in conjunction with the system of FIGS. 1-4, persons skilled in the art will understand that any system configured to perform the method steps, in any order, is within the scope of the inventions.

The method 500 begins at step 510, where the mobile device 116 receives an indicia of a location 222. In one embodiment, the mobile device 116 takes a photograph of a barcode, QR code or a landmark at the location as indicia of the location 222. In another embodiment, the indicia of the location 222 is transmitted from a transmitter at the location to the mobile device over a short-range radio, such as an RFID radio or a NFC radio.

At step 520, the mobile device 116 calculates its GPS position 212. Persons skilled in the art would immediately recognize several techniques for accomplishing this calculation. For example, a GPS position 212 may be calculated based on triangulation of signals from GPS satellites 210 or cellular towers.

At step 530, the server machine 102 receives the indicia of the location 222, the GPS position 212, and user account data, such as a user ID 202, to the server machine 102 from the mobile device 116. In one embodiment, such a transmission is carried out over a network 114, such as the Internet or a cellular network.

At step 540, the server machine 102 determines whether the GPS position 212 relates to a geographic zone associated with the location from which the indicia of location 222 was received. If not, then processing proceeds to step 570, where the server machine 102 does not cause a next action to occur. In one embodiment the next action not occurring implies the server 102 does not place a mark on a digital punch card. Then, according to one embodiment, processing continues to step 590, where the server machine 102 transmits, and the mobile device 116 receives a denial message. In one embodiment, the denial message states that a mark was not added to a punch card and provides an explanation as to why the mark was not added.

However, if the GPS position 212 relates to a geographic zone associated with a location from which the indicia of location 222 were received, then processing proceeds to step 550, where the server machine 102 determines whether other security conditions 206 are satisfied. According to one embodiment, the security conditions 206 include one or more of: (1) that the time difference between a timestamp 224 associated with the indicia of the location 222 and the timestamp 214 associated with the GPS position 212 must be less than a threshold time difference, (2) a timestamp 224 associated with the indicia of the location 222 is a time when store 350 is open, and (3) that the user account has not requested a mark on the punch card for a certain time period before requesting the current mark. In another embodiment, the indicia of the location 222 is a photograph of a landmark, barcode or QR code at the location, and the security conditions 206 are that the photograph is a likely original photograph rather than a photocopy or an image generated without taking a photograph, suggesting that the user of the mobile device 116 has taken a new, original photograph of the landmark, barcode or QR code, and, therefore, must have visited the place where the landmark, barcode or QR code is found. One skilled in the art would realize that there are many different methods for determining whether an image is a likely original photograph.

If the server machine 102 determines that the other security conditions 206 are satisfied, then, at step 560, the server machine 102 causes a next action to occur. According to one embodiment, the next action is placing a mark on a digital punch card. In one embodiment, processing then continues to step 580, where the server 102 provides a confirmation message, which is received at the mobile device 116. In one embodiment, the confirmation message is that a mark has been added to a digital punch card.

If the server machine 102 determines that the other security conditions 206 are not satisfied, then processing proceeds to step 570, where the server machine 102 does not cause a next action to occur. Next, according to one embodiment, processing proceeds to step 590, where the server machine 102 transmits and the mobile device 116 receives a denial message.

While the foregoing is directed to one particular embodiment of the invention, those skilled in the art would recognize that, in other alternative embodiments, the techniques described herein may be applied to other situations where proof of the presence of a mobile device or a user of a mobile device at a certain location is desirable. For example, the techniques described herein could be used to prove or suggest that a user of a mobile device attended a lecture, arrived at a workplace at a certain time, climbed a mountain, visited a gym, etc.

In sum, the disclosed techniques provide, among other things, enhancements to digital punch cards. In one implementation example, a mobile device executing a digital punch card software application receives, from an external device, a signal, such as a photograph of a barcode or quick response (QR) code, a near-field communication (NFC) signal, a radio frequency identification (RFID) signal or any similar signal providing data indicative of a location. The mobile device also records its current position based on a global positioning system (GPS) signal. The mobile device then transmits the data indicative of the location, the GPS position, and the user account data over a network to a server machine. The server machine then verifies the legitimacy of the transaction based on one of the following security conditions: (1) that the GPS position was taken at a geographic location corresponding to the first signal, (2) that the GPS position and the data indicating a location were taken at approximately the same time, and (3) that the account associated with the mobile device did not provide more than one transmission to the server machine within a certain time period.

One advantage of the disclosed approach is that a digital punch card can be implemented securely on a mobile device in a manner that is more difficult to falsify by a dishonest customer. As a result, shopkeepers can attract and retain customers through the implementation of promotional punch cards without the worry of customers losing or damaging paper punch cards or falsifying digital or paper-based punch cards.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

The scope of the present invention is determined by the claims that follow.

What is claimed is:

1. A method to verify locations of users of portable computing devices, comprising:
   receiving, by a portable computing device, an input indicating a location of the portable computing device, wherein the input is received from an at-location element proximate to the portable computing device, and wherein the location of the portable computing device comprises a first geographic zone;
   receiving, by the portable computing device, a position associated with the portable computing device at a time that the input indicating the location of the portable computing device was received;
   determining, by the portable computing device, that the first geographic zone corresponds to the position associated with the portable computing device at the time that the input indicating the location of the portable computing device was received; and in response to determining that at least one security condition is satisfied, causing, by the portable computing device, a next action to occur.

2. The method of claim 1, wherein determining that the position is associated with the first geographic zone comprises determining that the position associated with the portable computing device at the time that the input indicating the location of the portable computing device was received is within the first geographic zone.

3. The method of claim 2, further comprising:
receiving, by the portable computing device, a first timestamp indicating when the portable computing device receives the input indicating the location of the portable computing device; and
receiving, by the portable computing device, a second timestamp indicating when the portable computing device receives the position associated with the portable computing device at the time that the input indicating the location of the portable computing device was received.

4. The method of claim 3, further comprising determining, by the portable computing device, that at least one security condition is satisfied in response to determining that the first geographic zone corresponds to the position, the at least one security condition comprises a determination that a time difference between the first timestamp and the second timestamp is less than a threshold amount of time.

5. The method of claim 3, further comprising determining, by the portable computing device, that at least one security condition is satisfied in response to determining that the first geographic zone corresponds to the position, the first geographic zone is associated with a place of business, and wherein the at least one security condition comprises a determination that the first timestamp reflects a time when the place of business is open.

6. The method of claim 3, further comprising receiving, by the portable computing device:
a second input indicating a second location of the portable computing device, wherein the second input is received from a second at-location element proximate to the portable computing device,
a third timestamp indicating when the portable computing device receives the second input indicating the second location,
a second position associated with the portable computing device at a time that the input indicating the second location of the portable computing device was received, and
a fourth timestamp indicating when the portable computing device receives the second position associated with the portable computing device at the time that the second input indicating the second location of the portable computing device was received; and
determining, by the portable computing device, that at least one security condition is satisfied, the at least one security condition comprises determining that a time difference between the later of the first timestamp and the second timestamp and the earlier of the third timestamp and the fourth timestamp exceeds a threshold amount of time.

7. The method of claim 1, wherein the portable computing device executes a digital punch card software application.

8. The method of claim 1, wherein causing a next action comprises crediting, by the portable computing device, a digital punch card.

9. A computer program product, comprising:
a non-transitory computer-readable medium having computer-executable program instructions embodied therein that when executed by a computer cause the computer to verify locations of users of portable communication devices, the computer-readable program instructions comprising:
computer-readable program instructions to receive an input indicating a location of a portable computing device from an at-location element proximate to the portable computing device, wherein the location of the portable computing device comprises a first geographic zone;
computer-readable program instructions to receive a position associated with the portable computing device;
computer-readable program instructions to determine that the first geographic zone corresponds to the position associated with the portable computing device; and
computer-readable program instructions to cause a next action to occur when at least one security condition is satisfied.

10. The computer-readable medium of claim 9, wherein determining that the position associated with the portable computing device corresponds to the first geographic zone comprises computer-readable program instructions to determine that the position associated with the portable computing device is within the first geographic zone.

11. The computer-readable medium of claim 10, further comprising:
computer-readable program instructions to receive a first timestamp indicating when the portable computing device receives the input indicating the location of the portable computing device; and
computer-readable program instructions to receive a second timestamp indicating when the portable computing device receives the position associated with the portable computing device.

12. The computer-readable medium of claim 11, further comprising computer-readable program instructions to determine that at least one security condition is satisfied in response to determining that the first geographic zone corresponds to the position, wherein the at least one security condition comprises a determination that a time difference between the first timestamp and the second timestamp is less than a threshold amount of time.

13. The computer-readable medium of claim 11, further comprising computer-readable program instructions to determine that at least one security condition is satisfied in response to determining that the first geographic zone corresponds to the position, wherein the first geographic zone is associated with a place of business, and wherein the at least one security condition comprises a determination that the first timestamp reflects a time when the place of business is open.

14. The computer-readable medium of claim 11, further comprising computer-readable program instructions to receive:
a second input indicating a second location of the portable computing device, wherein the second input is received from a second at-location element proximate to the portable computing device,
a third timestamp indicating when the portable computing device receives the second input indicating the second location,
a second position associated with the portable computing device, and a fourth timestamp indicating when the portable computing device receives the second position associated with the portable computing device; and computer-readable program instructions to determine that at least one security condition is satisfied, the at least one security condition comprises a determination that a time difference between the later of the first timestamp and the second timestamp and the earlier of the third timestamp and the fourth timestamp exceeds a threshold amount of time.

15. The computer-readable medium of claim 9, wherein the portable communication device executes a digital punch card software application.

16. The computer-readable medium of claim 11, wherein causing a next action comprises computer-readable program instructions to credit a digital punch card.

17. A method to verify locations of users of portable communication devices, comprising:

receiving, by a portable computing device, an input indicating a location of the portable computing device, wherein the input is received from an at-location element, and wherein the location of the portable computing device comprises a first geographic zone;

calculating, by the portable computing device, a position associated with the portable computing device at a time that the input indicating the location of the portable computing device was received;

transmitting, by the portable computing device, the input indicating the location of the portable computing device and the position associated with the portable computing device to a server computing device; and receiving, by the portable computing device, a confirmation message from the server computing device, the confirmation message indicating that the first geographic zone corresponds to the position associated with the portable computing device at the time the input indicating the location of the portable computing device was received, or receiving, by the portable computing device, a denial message from the server computing device, the denial message indicating that the first geographic zone does not correspond to the position associated with the portable computing device at the time that the input indicating the location of the portable computing device was received.

18. The method of claim 17, wherein the input indicating the location of the portable computing device comprises a radio frequency identification (RFID) signal or a near-field communication (NFC) signal, and the at-location element comprises a transmitter device.

19. The method of claim 17, wherein the input indicating the location comprises of the portable computing device a photograph of a barcode or a quick response (QR) code, and the at-location element comprises the barcode or the QR code.

20. The method of claim 17, wherein the portable computing device executes a digital punch card software application.

21. The method of claim 1, wherein the position comprises one or more of a global positioning system (GPS) position, a Wi-Fi positioning system position, an Internet Protocol (IP) address location, and a cellular tower triangulation position.

22. The computer-readable medium of claim 9, wherein the position comprises one or more of a global positioning system (GPS) position, a Wi-Fi positioning system position, an Internet Protocol (IP) address location, and a cellular tower triangulation position.

23. The method of claim 17, wherein the position comprises one or more of a global positioning system (GPS) position, a Wi-Fi positioning system position, an Internet Protocol (IP) address location, and a cellular tower triangulation position.

* * * * *